Feb. 9, 1954  C. G. PUCHY  2,668,919
ELECTRICAL SYSTEM FOR OPERATING INVERTERS IN PARALLEL
Filed May 19, 1952
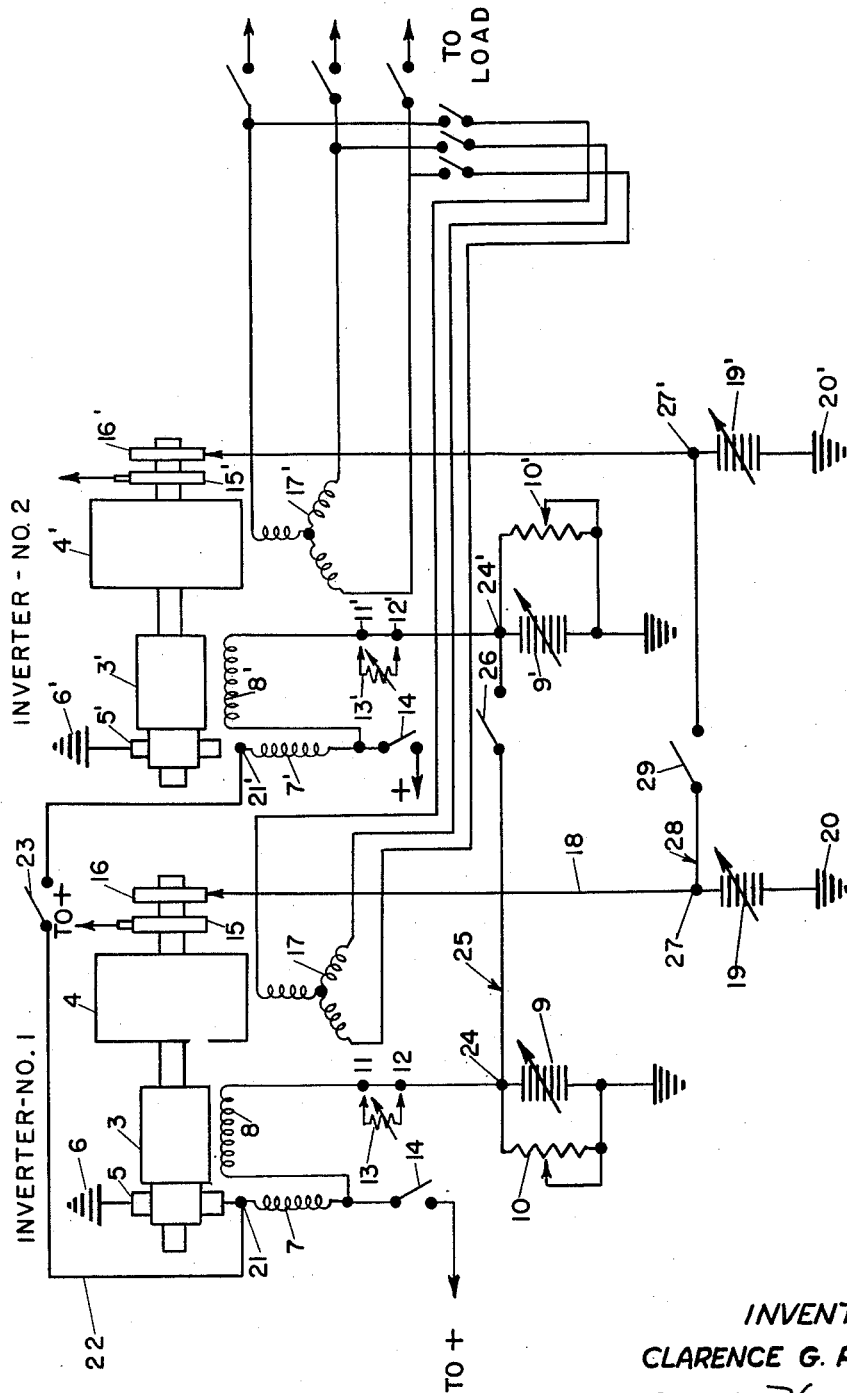
INVENTOR
CLARENCE G. PUCHY
*Frank H. Hanson*
ATTORNEY Patented Feb. 9, 1954

2,668,919

UNITED STATES PATENT OFFICE 2,668,919

ELECTRICAL SYSTEM FOR OPERATING INVERTERS IN PARALLEL

Clarence G. Puchy, Lyndhurst, Ohio, assignor to Jack & Heintz, Inc., Cleveland, Ohio, a corporation of Delaware Application May 19, 1952, Serial No. 288,640

4 Claims. (Cl. 307—58)

One of the primary objects of this invention is to provide a simple and direct means for operating and synchronizing two or more inverters in parallel.

Another object is to provide such a means for operating two or more inverters in parallel where the inverters are provided with continuous type automatic voltage and frequency, or speed, control of the carbon pile type and two or more machines of the same basic electrical design. Furthermore, and assuming correct output phase connections, these machines are of a size and design similar to aircraft units which are capable of being synchronized by switching output power lines directly together without the use of synchronizing devices.

Generally speaking, and as applied to the problem of a parallel operation of two inverters, my first step in properly synchronizing the operation of two parallel inverters is to install a series motor equalizer between the series windings of the two inverters and to provide an equalizer switch which may be either manually or automatically operated. My next step is to add a speed governor equalizer between the two carbon pile speed regulators. The third step requires an equalizer connection between the two carbon pile voltage regulators. Equalizer switches are also used in governor and voltage regulator equalizer busses.

For practical operation, the combination of these three equalizers has been found by me to accomplish proper synchronous paralleling operation of two or more inverters. However, I also propose to add an optional low variable resistor in the shunt windings of the series fields of the two inverters.

With the foregoing and other objects in view, the invention resides in the combination of parts and in the details of construction hereinafter set forth in the following specification and appended claims, certain embodiments thereof being illustrated in the accompanying drawing, which is a schematic illustration of two inverters in circuit and showing my invention as applied thereto for parallel operation.

Referring more particularly to the drawing I have schematically shown two inverters, labeled inverter number 1 and inverter number 2. The inverter number 1 is shown to have a motor including a D. C. armature 3 and an alternator field 4. The armature D. C. brushes 5 lead to ground 6 and to a series field winding 7. Also in the motor circuit in a shunt field 8 that is in circuit with a carbon pile regulator 9 of the speed governor. Also, in a parallel circuit with the carbon pile regulator 9 is a variable resistor 10. In the shunt field circuit between points 11 and 12 I have also shown a variable resistor 13. The main inverter motor starting switch 14 is shown in open position in the drawing.

The alternator field assembly contains brushes 15 and 16. 17 is the alternator armature. From brush 16 lead 18 extends to a carbon pile voltage regulator 19 to ground at 20.

Inverter number 2 is provided with a motor comprising a D. C. armature 3' and an A. C. alternator 4'. The armature brush 5' connects to ground at 6' and is in circuit with a series field 7' and a shunt field 8'. A starting switch 14' is employed and a variable resistor 13' is arranged between points 11' and 12'. The speed governor carbon pile is shown at 9' and is provided with a shunting variable resistor 10'. The alternator assembly comprises brushes 15' and 16' and an A. C. armature 17'. The alternator field is connected through a carbon pile voltage regulator 19' to ground at 20'.

Connected at points 21 and 21' in the series motor field circuits of inverters number 1 and numer 2 I employ a series field equalizer generally indicated at 22 and which is provided with a switch 23 that may be manually or automatically operated.

Connected at points 24 and 24' in the speed governor circuit, I employ a speed governor equalizer generally indicated at 25 and which is provided with a switch 26 that may be either manually or automatically operated.

Connected at points 27 and 27' in the voltage regulator circuits of the two inverters I employ a voltage regulator equalizer 28 which is provided with a switch 29 that may be either manually or automatically operated.

I have found that in parallel operation of inverters, the provision of a series field equalizer 22, or a speed governor equalizer 25, or a voltage regulator equalizer 27, either separately, or any two of the three equalizers together, is not sufficient for proper parallel inverter operation. I have found that the combined use of these three equalizers together gives the desired results. I have also found that where very close output load division or control is required, it is desirable and advantageous to use the two low variable resistances shown at 13 between points 11 and 12 in inverter number 1 and 13' between points 11' and 12' in inverter number 2 in the shunt field circuits of the respective inverters. For all practical work, however, the use of these resistors is not required.

I have thus provided a simple and direct means for operating two or more inverters in parallel and particularly those inverters having continuous type automatic voltage and frequency, or speed, controls of the carbon pile type and those inverters having the same basic electrical design. My system applies to units operating at load power factors greater than 0.9.

By means of my invention, I have acquired simplicity of circuits inasmuch as only sequence switching and the three equalizer connections are required. I have obtained proper and stable load division, from no load to full load, if the inverters are pre-adjusted to approximately the same voltage and frequency, or speed, at any given load. Even with inverters out of frequency, or speed adjustment as much as five percent, I have been able by my system, to obtain satisfactory and stable load division. I have also obtained good load division at unity power factors with satisfactory and stable load division at 0.9 power factor. With lower power factors, it is preferable to employ conventional differential transformer reactor networks in the A. C. voltage regulator circuits.

I claim:

1. In combination in an electrical system including a plurality of inverters for changing direct electric current into alternating electric current, each of which are provided with continuous type automatic voltage, frequency and speed control of the carbon pile type, automatic means for operating said inverters in parallel and synchronizing the operation thereof, said means including a series motor equalizer between the series windings of said inverters and an equalizer switch therefor, a speed governor equalizer between the carbon pile speed regulators of said inverters and an equalizer switch therefor, an equalizer connection and switch between the carbon pile voltage regulators of said inverters and a low variable resistor in the shunt field windings of the series fields of said inverters.

2. In combination in an electrical system including a plurality of inverters for changing direct electric current into alternating electric current, each of which are provided with continuous type automatic voltage, frequency and speed control of the carbon pile type, automatic means for operating said inverters in parallel and synchronizing the operation thereof, said means including a series motor equalizer between the series windings of said inverters, a speed governor equalizer between the carbon pile speed regulators of said inverters and an equalizer connection and switch between the carbon pile voltage regulators of said inverters.

3. In combination in an electrical system including a plurality of inverters for changing direct electric current into alternating electric current, each of which are provided with continuous type automatic voltage, frequency and speed control of the carbon pile type, automatic means for operating said inverters in parallel and synchronizing the operation thereof, said means including a series motor equalizer between the series windings of said inverters and an equalizer switch therefor, a speed governor equalizer between the carbon pile speed regulators of said inverters and an equalizer switch therefor and an equalizer connection and switch between the carbon pile voltage regulators of said inverters.

4. In combination in an electrical system including a plurality of inverters for changing direct electric current into alternating electric current, each of which are provided with continuous type automatic voltage, frequency and speed control of the carbon pile type, automatic means for operating said inverters in parallel and synchronizing the operation thereof, said means including a series motor equalizer between the series winding of said inverters, a speed governor equalizer between the carbon pile speed regulators of said inverters, an equalizer connection and switch between the carbon pile voltage regulators of said inverters and a low variable resistor in the shunt field windings of the series fields of the said inverters.

CLARENCE G. PUCHY.

References Cited in the file of this patent
UNITED STATES PATENTS

| Number | Name | Date |
|---|---|---|
| 710,363 | Lamme | Sept. 30, 1902 |